United States Patent
Carsten

[11] 3,875,496
[45] Apr. 1, 1975

[54] STATIC INVERTER USING MULTIPLE SIGNAL CONTROL LOOPS

[75] Inventor: Bruce W. Carsten, North Vancouver, B. C., Canada

[73] Assignee: Glenayre Electronics, Ltd., North Vancouver, B. C., Canada

[22] Filed: Mar. 13, 1974

[21] Appl. No.: 450,559

[52] U.S. Cl. .................. 321/44, 321/18, 321/45 R
[51] Int. Cl. ............................................. H02m 7/20
[58] Field of Search ...................... 321/18, 44, 45 R

[56] References Cited
UNITED STATES PATENTS 3,278,827   10/1966   Corey et al. .................... 321/44
3,624,486   11/1971   Oates ............................. 321/18 X Primary Examiner—R. N. Envall, Jr.
Attorney, Agent, or Firm—Christensen, O'Connor, Garrison & Havelka

[57] ABSTRACT

A static inverter for converting a direct current input signal to an alternating current output signal, the inverter including a series of control loops to insure a stable, constant amplitude sine wave output. The output sine wave is generated by comparing a high frequency triangle wave with a corrected reference sine wave, the output of the triangle wave comparator controlling the switching of conventional switching and filtering sections. The magnitude of the triangle wave is maintained proportional to the DC input signal, thereby maintaining the output sine wave relatively constant as the magnitude of the DC input signal varies. For control and regulation of the output, the AC signal present at the load is rectified, filtered and compared with a DC reference signal, the output of the DC comparator being used to proportionally adjust the amplitude of an AC reference sine wave. The amplitude adjusted reference sine wave is then compared with the output of the inverter to generate a signal representative of the distortion of the output, and this distortion signal is then summed with the amplitude adjusted reference sine wave to produce the corrected sine wave for application to the triangle wave comparator.

16 Claims, 9 Drawing Figures 3,875,496

STATIC INVERTER USING MULTIPLE SIGNAL CONTROL LOOPS

BACKGROUND OF THE INVENTION

This invention relates generally to the art of static inverters and more specifically to those static inverters utilizing control loops to regulate the output sine wave.

It is well-known in the art to use a high-speed comparator which responds to a triangle wave and a reference sine wave to control conventional switching and filtering circuits in the generation of an output sine wave from a DC input signal. This system results in a pulse width modulated (PWM) signal similar to that shown in FIG. 2 at the output of the switching circuit of the inverter. The duty cycle of the constant-rate pulses is varied under the control of the high speed comparator in such a fashion that, after the signal of FIG. 2 is filtered, a sine wave output is produced. This type of inverter results in a high-performance, relatively low-cost inverter.

Generally, it is desirable that the output sine wave be as stable and as free from distortion as possible. The amplitude of the output sine wave should remain relatively constant and stable under varying magnitudes of the DC input signal, and under various load conditions. Various types of control techniques may be used to achieve such a regulated output signal. One possible approach utilizes a closed feedback loop to compare a sample of the output voltage with a reference sine wave. The difference between the output and the reference sine wave is an error signal which in turn is used to vary the pulse duty cycle of the inverter switching section by changing the amplitude of the reference sine wave. This type of control, however, if frequently inaccurate, and becomes unstable under certain reactive loads.

Another possible approach utilizes an open loop feedback, which system senses the output voltage present at a remote load and after rectification, compares it with a DC reference. The error signal produced by this DC comparator is then used to vary accordingly the amplitude of the reference sine wave, which signal is then applied to the comparator. This type of control system is more stable than the closed loop system, but it has considerable difficulty in responding quickly to load changes, as well as an inability to correct output signal distortions caused by the nonlinear impedances of the inverter circuit.

Thus, control loops schemes to date in static inverter circuits each have significant operational disadvantages and frequently must be designed for a particular application. No one control system heretofore known provides a stable, responsive output signal with a capacity for distortion correction.

In view of the above, it is a general object of the present invention to provide a static inverter which overcomes the disadvantages of the prior art.

It is another object of the present invention to provide a static inverter in which the amplitude of the output sine wave remains constant under varying input, line, and load conditions.

It is a further object of the present invention to provide a static inverter having a stable output signal under varying input, line, and load conditions.

It is another object of the present invention to provide a static inverter which compensates for distortion in the output signal.

It is a still further object of the present invention to compensate for distortion in the output sine wave by distorting the reference sine wave counter to the distortion introduced by the other inverter circuitry and/or nonsinusoidal load current.

SUMMARY OF THE INVENTION

Accordingly, the present invention includes a comparison means which compares the amplitudes of a corrected reference wave and a signal having a triangle-like waveform and generates driving signals in response thereto, the driving signals typically changing state when the respective signal amplitudes are equal. These driving signals are used to control the selective application of a DC input signal to a filtering section, the output of which is an AC output voltage, which is in turn coupled to a load. The AC signal present at the load is converted to its equivalent DC voltage and then compared with a DC voltage of predetermined magnitude. Any difference between the two signals is used to adjust the amplitude of an AC reference voltage. The waveform of the adjusted AC reference signal is then compared with the waveform of the AC output voltage, and an amplified error signal developed which is proportional to the difference therebetween. This error signal is then algebraically summed with the adjusted AC reference signal to provide the corrected reference signal.

DESCRIPTION OF THE PREFERRED EMBODIMENT

Figure 3:
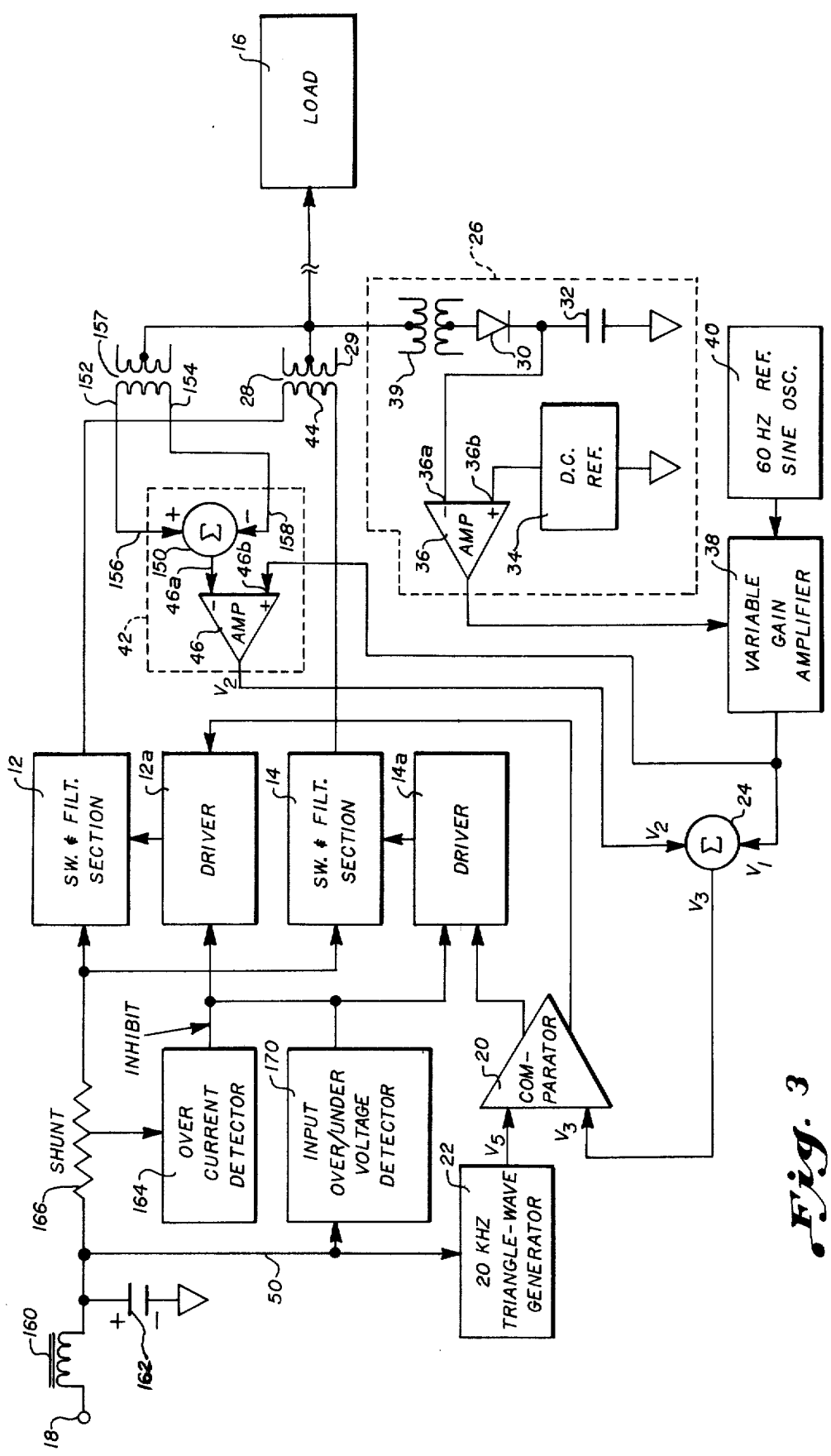
FIG. 3 is a block diagram of the static inverter of the present invention.

Referring to FIG. 3 the static inverter of the present invention generally comprises two conventional switching and filtering sections 12 and 14 operating into a single load 16, in combination with several control loop circuits which regulate the output, as well as correcting the signal distortion introduced by the switching and filtering elements and nonsinusoidal load currents. Like other static inverters, a DC input of variable magnitude is applied to circuit input connection 18, and the inverter provides an AC sine wave of substantially constant amplitude to the load 16 into which the inverter is working. The output sine wave is generated by the control of the switching circuits 12 and 14 by a high speed comparator 20, which is responsive to a high frequency triangle wave signal $V_5$ from generator 22, and a corrected 60 Hz reference sine wave $V_3$ from summing junction 24. The operation of the switching and filtering sections 12 and 14 in response to the control signals from comparator 20 will be explained in detail in the following paragraphs.

Output amplitude regulation and correction is achieved primarily by feedback circuit 26. The output signal is sensed remotely at the load 16, which is connected indirectly to the inverter by means of the transformer 28, or at the inverter output at the secondary winding 29 of transformer 28. The signal sensed at the load is first rectified by diode 30 and capacitor 32 and then compared with a DC reference voltage from source 34 by comparator 36, the output error signal of which controls a variable gain amplifier 38, which amplifies the 60 Hz reference sine wave from oscillator 40. This control circuit is a slow-responding circuit for regulating the amplitude of the output signal with respect to variations in line voltage and changes in load characteristics.

A second control loop is the antidistortion feedback circuit 42, which characteristically responds quickly to differences between the signal present at the inverter output, sensed through transformer 157, and the signal $V_1$ from the variable gain amplifier 38, which signal is directly proportional to the 60 Hz reference sine wave. The amplified error signal $V_2$ generated by comparator 46 is applied to the summing junction 24, along with the output $V_1$ of the variable gain amplifier 38. Circuit 42 quickly responds to output signal distortion, and generates a countervailing distortion, which is added to the reference sine wave by summing junction 24. The combination of control loops 26 and 42 provide corrections for output signal distortion as well as output amplitude regulation for changes in the line and the load. These circuits, however, while providing good regulation for load changes and output distortion, become unstable for large changes in the magnitude of the DC input signal. A third control circuit, comprising a direct connection 50 between the filtered DC input and the triangle wave generator 22 compensates immediately for significant changes in the magnitude of the DC input, thereby providing a rough initial regulation for the output signal. If the magnitude of the DC input suddenly significantly increases or decreases, the magnitude of the triangle wave generated by generator 22 increases or decreases proportionately, thereby changing the duty cycle of the PWM signal from the switching circuits to such an extent that the amplitude of the output signal remains fairly constant. The combination of the input loop 50 and the two feedback control circuits 26 and 42 results in an inverter which provides a regulated, constant amplitude AC sine wave output, even with significant variations in the magnitude of the input and the load.

Figure 1:
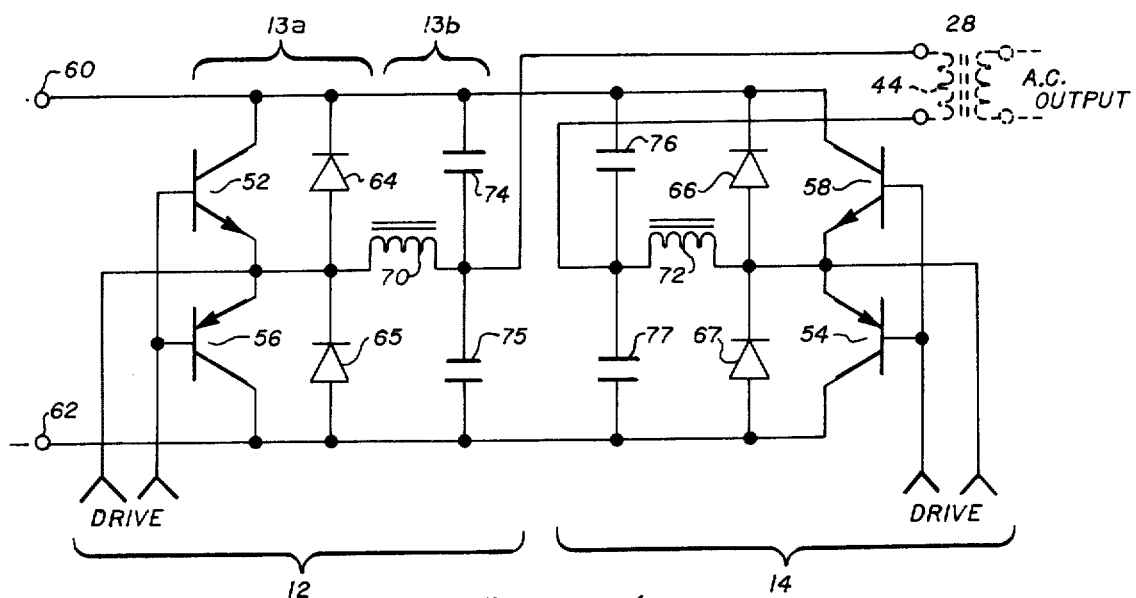
FIG. 1 is a diagram of the switching filter circuit used in the inverter of the present invention.

The structure and operation of the static inverter of the present invention will now be described in detail. Referring to FIG. 1, the switching and filter circuits 12 and 14 of FIG. 3 are shown arranged in a conventional back-to-back arrangement with a common output through the primary 44 of transformer 28. The two circuits are identical, and are driven by opposite polarity but otherwise identical signals from comparator 20 through driver circuits 12a and 14a. Circuits 12 and 14 are arranged with matching transistors such that when transistors 52 and 54 are on, transistors 56 and 58 are off, and vice versa.

In operation, a DC input signal is provided between connections 60 and 62, which connections are common to both circuits. Blocking diodes 64, 65, 66, and 67 are provided with each transistor, which diodes provide a path for current flow back into the supply from reactive loads. Inductors 70 and 72 with their associated capacitors 74, 75, and 76, 77 form the lowpass filter section of each circuit, and convert the pulse output from the transistor switching sections to a varying amplitude wave. As transistors 52 and 54 turn on under the control of the driving signals, transistors 56 and 58 turn off. A current path is established through transistor 52, inductor 70, the primary 44 of transformer 28, inductor 72 and transistor 54. During the time that transistors 52 and 54 are on for more than 50 percent of the switching period (duty cycle greater than 50 percent), a positive current will pass through the primary winding 44, producing a voltage which slowly increases in amplitude from zero to a peak and then slowly decreases to zero, in accordance with the varying duty cycle of the pulse output of the switching section.

When transistors 52 and 54 are off for more than 50 percent of the switching period (duty cycle less than 50 percent), transistors 56 and 58 are on for the corresponding interval. The current now will flow through transistor 58, inductor 72, primary winding 44, inductor 70 and transistor 56. The voltage produced across primary winding 44 decreases gradually to a negative peak, at which point it begins to rise again. The total signal across primary winding 44 is thus a sine wave.

Figure 2:
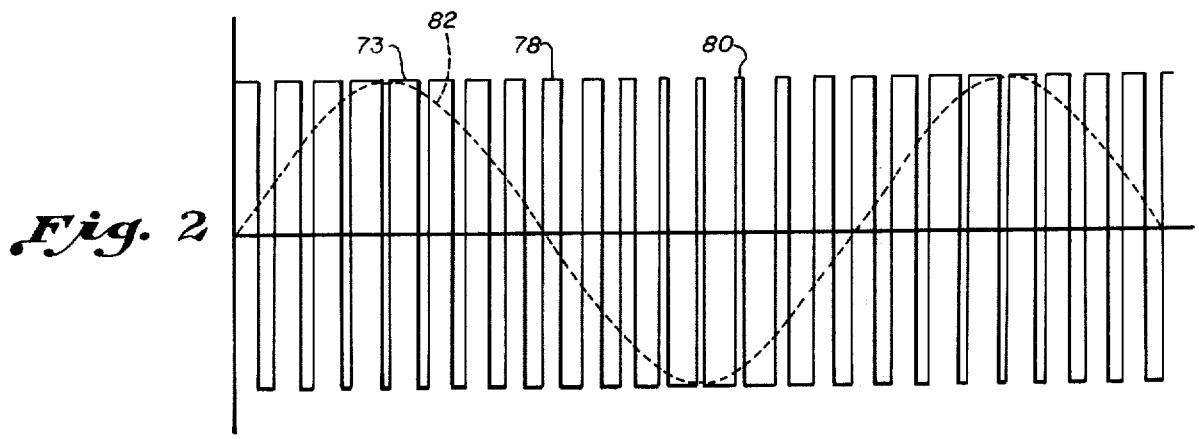
FIG. 2 is a diagram of the output of the switching sections of the present invention with a superimposed sine wave.

The pulse output of a switching section is shown in FIG. 2. The signal has a repetition rate, referred to as the carrier frequency, equal to the frequency of the triangle wave generator. Although the carrier frequency remains the same, the duty cycle of the pulses varies, depending on the relative on-off times of the transistors 52, 54, 56 and 58 in the switching sections. FIG. 2 shows that one set of transistors is on for a significantly longer time than the other set in the vicinity of point 73, corresponding to one signal peak. The relative on-off times are about equal at point 78, corresponding to a signal midpoint, while at point 80 the other set of transistors is on for substantially a longer time than the one set, corresponding to the opposing output signal peak. By filtering this varying duty cycle pulse output, a sine wave 82 shown superimposed in FIG. 2, is obtained at the primary winding 44. Thus, when the relative on-off times of the two sets of transistors are most unequal (maximum or minimum duty cycle), the amplitude of the output sine wave will be at a peak, while when the two sets have substantially equal on-off times (50 percent duty cycle), the amplitude of the output sine wave will be at a midpoint between the positive and negative peaks.

Referring to FIG. 3, the driving signals provided to the switching and filtering circuits are generated by high speed comparator 20. The comparator 20 is responsive to a 20 kHz triangle wave from generator 22, and a corrected reference sine wave $V_3$ of known frequency from the output of summing junction 24. The magnitude of the triangle wave is controlled by a loop connection 50 from the filtered DC input of the inverter to the input of the generator 22. Thus, as the DC input increases in magnitude, the amplitude of the 20 kHz triangle wave will also increase proportionately.

Figure 5:
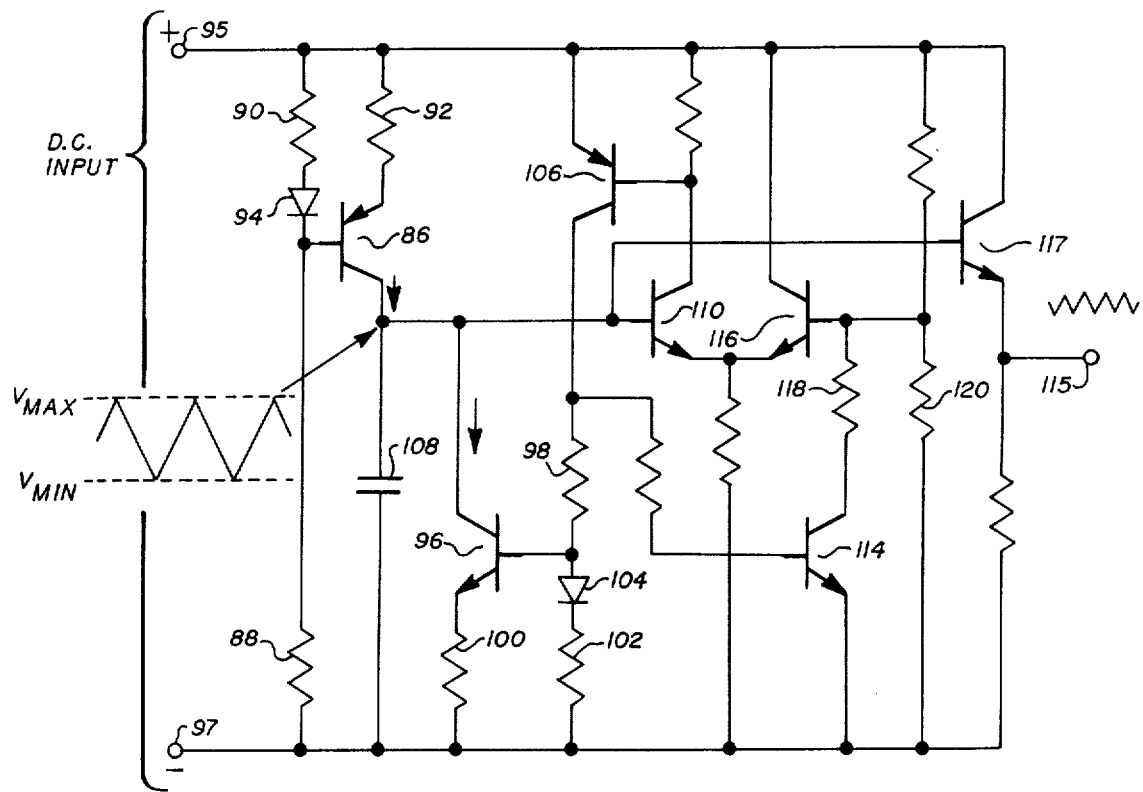
FIG. 5 is a schematic diagram of the triangle wave generator used in the present invention.

For best operation, the triangle wave generator should have linearly increasing and decreasing slopes, as well as an output frequency which is independent of the magnitude of the DC input. Other triangle-like waveforms, however, such as modified saw-tooths, may also be used with the circuitry of the present invention. The triangle wave oscillator used in the present invention is shown schematically in FIG. 5, although of course, other triangle wave circuits having the same capabilities described above may be substituted for the circuit shown in FIG. 5.

In operation, transistor 86 with its associated resistors 88, 90 and 92, and diode 94, acts as a controlled current source, the magnitude of which current is proportional to the DC input voltage applied to connections 95 and 94 from loop 50. Transistor 96, with resistances 98, 100 and 102, and diode 104, also provides a current which is greater than that of transistor 86 and is proportional to the input voltage when transistor 106 is on. When transistor 96 is off, capacitor 108 will be charged by transistor 86 until the voltage on the capacitor reaches a level $V_{max}$ sufficient to turn transistor 110 on and transistor 116 off. Transistors 106, 96 and 114 turn on likewise in turn. As long as transistor 110 (and hence, transistor 114) remains on, resistor 118 is placed in parallel with resistor 120. During this interval, transistor 96 is discharging capacitor 108. When the voltage on capacitor 108 decreases to a value $V_{min}$, transistor 110 shuts off, and hence, transistors 106, 114 and 96 do likewise and the voltage across capacitor 108 again begins to rise, repeating the cycle. The triangle wave output voltage is provided at output connection 115, transistor 117 providing a buffer between the capacitor 108, across which appears the triangle wave, and the output, thereby insuring that the load placed on the output will not affect the waveform of the triangle wave.

Figure 7:
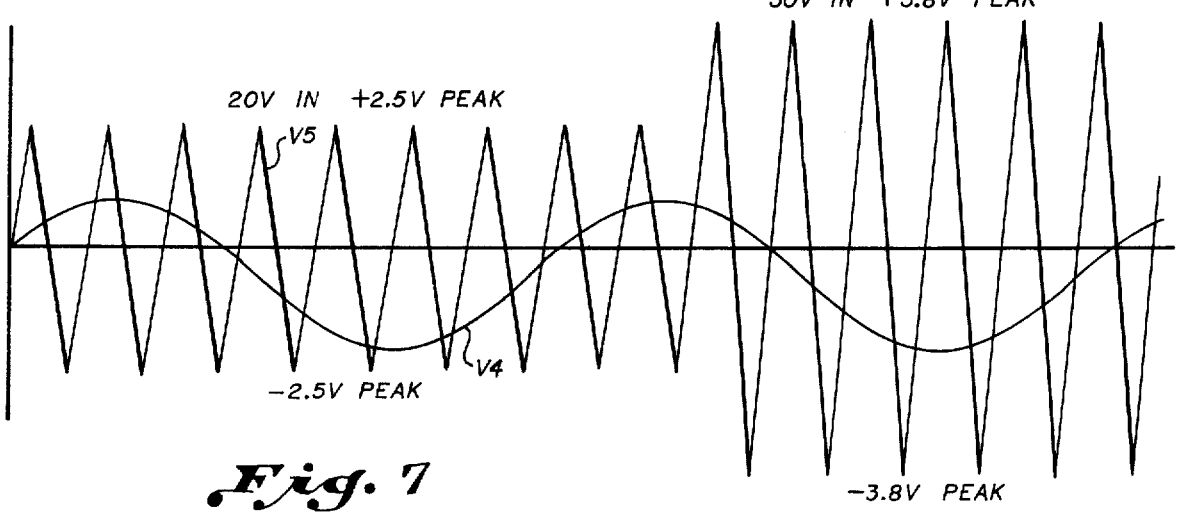
FIG. 7 is a signal diagram of the triangle wave input to the high speed comparator used in the present invention, showing the superposition of an idealized triangle wave and reference sine wave.

Referring again to FIG. 3, the varying amplitude triangle wave output $V_5$ of generator 22 is applied as one input to the high speed comparator 20. The other input is a 60 cycle reference sine wave $V_3$ which is corrected in accordance with feedback control circuits to be explained in following paragraphs. The output signals of the comparator 20, which control the switching and filtering circuits through drivers 12a and 14a, are generated in time when the corrected 60 Hz reference sine wave signal $V_3$ is coincident with (i.e., crosses) the high frequency triangle wave $V_5$. Referring to FIGS. 1 and 7, transistors 52, 54, 56 and 58 will switch states in response to comparator outputs at each point in time where the sine wave (shown as idealized signal $V_4$) crosses the higher frequency triangle wave. With a stable frequency triangle wave, the duty cycle of the pulse output of the switching sections will vary with the magnitude of the sine wave. As the 60 Hz sine wave approaches one peak in amplitude, the duty cycle of the pulse output of the switching section tends toward one extreme or peak, in which one set of transistors is on for a significantly longer time than the other set during one pulse period. As the sine wave approaches the opposite peak in amplitude, the duty cycle of the pulse output tends toward the opposite extreme, because the other set of transistors is on for a longer time than the one set. When the reference sine wave is at a midpoint position in amplitude, indicating that the two sets of transistors are on for relatively the same amount of time during one pulse period, the duty cycle of the resulting pulses is approximately 50 percent.

The frequency of the triangle wave is a compromise between the desirability of having a very high frequency for ease of filtering of harmonics and the desirability of having a relatively low frequency because of the power dissipated each time a transistor is switched. In order to obtain a pure sine wave from a square wave (the output of the switching section 13a ), it is necessary to filter out the harmonic frequencies present in the square wave. The lower order harmonics, i.e., the harmonics closest to the carrier frequency, are the most difficult to filter and are the strongest harmonics present. According to standard pulse theory, the generation of lower order harmonics can be significantly decreased by increasing the number of switching periods per cycle of the output signal. Typically, transistors permit a much higher switching frequency to be used without loss of measurable power, than with SCR's.

A carrier frequency of 20 kHz was chosen for the preferred embodiment, which is high enough to considerably ease the filtering of harmonic frequencies but not so high as to result in significant power loss. A triangle wave frequency of 20 kHz is considerably higher than that used in the prior art, and provides a significant operational advantage in decreasing the filtering requirements necessary to produce the desired output sine wave. By carefully selecting the switching transistors, the power losses at the high switching rate are not significantly greater than at switching rates an order of magnitude lower.

It will be understood by those skilled in the art that the magnitude of the triangle wave $V_5$ controls the magnitude of the sine wave signal at the primary winding 44 of the transformer 28. If the magnitude of the DC input is increased while the magnitude of the reference sine wave remains the same, the swing in the limits of the duty cycle of the switching section will be reduced accordingly, although the amplitude of the resulting pulses from switching section 13a will increase in accordance with the rise in DC input. As the limits of the duty cycle are reduced, the peak amplitude of the sine wave produced by the filtering section relative to the peak amplitude of the square waves produced by the switching sections will also decrease proportionately. The amplitude of the output sine wave thus will tend to remain the same in an absolute sense. The use of the DC input signal as the supply voltage for the triangle wave generator 22 provides an immediate compensation for changes in the magnitude of the DC inverter input, tending to maintain the amplitude of the output sine wave constant.

If the triangle wave produced by generator 22 has linear positive and negative slopes, the configuration of the output wave at primary winding 28 is determined by the configuration of the corrected reference sine wave $V_3$ applied as the other input to comparator 20. The corrected reference signal is a 60 Hz reference sine wave which has been adjusted in amplituude by operation of control circuit 26, and which has been distorted by antidistortion circuit 42.

A sine wave oscillator 40 is typically used to generate a low distortion 60 Hz reference sine wave, with the output frequency being relatively independent of the inverter supply voltage. Such oscillator circuits are well-known and are commercially available. The output of the sine wave oscillator 40 is applied to the variable gain amplifier 38. The variable gain amplifier 38 is also responsive at its control input to an error signal from circuit 26. In generating the error signal, the output signal present at a remote load 16 is sensed and reduced in voltage by transformer 39, the output of the transformer 39 being rectified by the series combination of a diode 30 and capacitor 32 to a substantially DC signal, which DC signal is applied to the inverting input 36a of operational amplifier 36 connected as a comparator. Other circuits which provide a representative DC signal from an AC signal may, of course, also be utilized. Connected to the noninverting input 36b of the operational amplifier is a source of predetermined DC magnitude reference voltage 34. The error signal at the output of the comparator 36 is applied to the control input of the variable gain amplifier.

Figure 4:
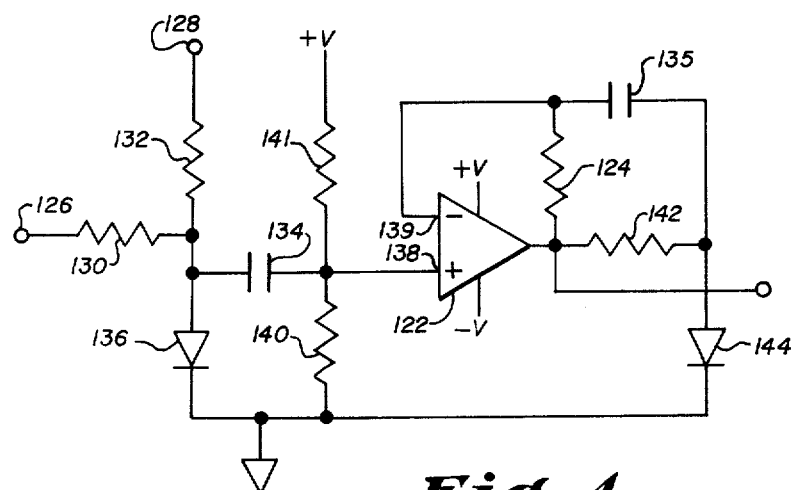
FIG. 4 is a schematic diagram of the variable gain amplifier used in the present invention.

The variable gain amplifier used in the present invention is shown in schematic form in FIG. 4. Other conventional variable gain amplifiers may be used, depending on the particular application of the inverter circuit. The circuit uses a conventional operational amplifier 122, with resistor 124 connected in standard fashion for DC feedback. The sine wave output from oscillator 40 is applied to input 126 and the DC control voltage from comparator 36 is applied to input 128. In series with the respective input connections are resistors 130 and 132, which convert the input voltages to corresponding currents. The other ends of resistors 130 and 132 are common and to one side of capacitor 134 and the anode of diode 136. The other side of capacitor 134 is connected to the noninverting input 138 of op-amp 122 and blocks any DC current. The cathode of diode 136 is connected to circuit common. Resistors 140 and 141 form a voltage divider to bias the noninverting input 138 of op-amp 122 at a DC lever approximately one-half the positive supply voltage. Because of the resistive feedback, the voltage at input 138 will appear at the output of op-amp 122, across resistor 142, which in turn produces a DC bias current in diode 144. The voltage on diode 136 is the logarithm of the current through it, due to its nonlinear characteristics. The AC portion of the voltage on diode 136 is coupled to the noninverting input 138 of op-amp 122. The op-amp maintains the same AC voltage on the inverting input 139 which is also the same as the AC voltage on the anode of diode 144, due to the low AC impedance of capacitor 135 with respect to resistor 124. The AC current in resistor 142, and hence the voltage output, is thus equal to the antilog of the AC voltage on diode 144. This log-antilog operation yields an AC output wave shape identical to the input, although the amplitudes will in general be different due to the different DC currents in diodes 136 and 144.

Diode 136 provides the variable gain capability of the circuit. Gain is controlled by the magnitude of the DC control voltage from comparator 36 at input 128. As the DC voltage, which produces a bias current for the diode 136 through resistor 132, changes, the operating point of diode 136 on its characteristic curve changes and the diode output changes. As the DC voltage increases, the gain of the circuit goes down, and vice-versa.

Figure 6A:
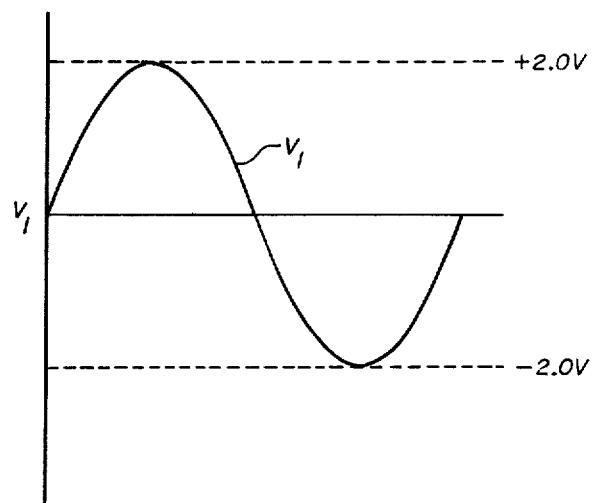
FIG. 6a is a signal diagram of the output of the variable gain amplifier.
Figure 6B:
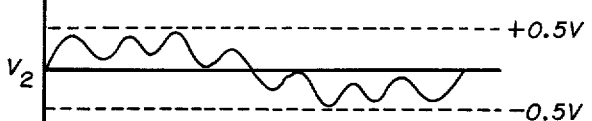
FIG. 6b is a signal diagram of the output of the anti-distortion feedback network.

The output of the variable gain amplifier is identical in phase and configuration to the output signal of the reference oscillator 40, although its amplitude will correspond to the level of the DC error signal from comparator 36. A typical output signal $V_1$ of the variable gain amplifier is shown in FIG. 6a. The amplitude adjustment of the reference sine wave by control circuit 26 provides load and line regulation, as well as compensation for internal element and voltage drifts. The circuit response to load transients is relatively slow, however, because it is a signal amplitude sensing circuit using a diode and a capacitor, the amplitude of the sensed signal being averaged over several cycles of operation. Furthermore, control circuit 26 is thus generally ineffective in correcting or compensating for signal distortions occurring in the signal output at the load 16.

To compensate for signal distortion caused typically by nonlinear elements in the inverter, an antidistortion control circuit 42 is provided. Referring again to FIG. 3, a conventional summing junction 150 is connected between the respective ends 152 and 154 of the secondary of transformer 157. The inverter output signal is sensed off the secondary 29 of transformer 157, the secondary of which is connected to inputs 150 and 158 of summing junction 150, respectively. By sensing the inverter output signal from the secondary 29 of transformer 28, the effect of nonsinusoidal load currents and the impedance of transformer 28 may be compensated for. The output of summing junction 150 is thus a sample of the signal present at the output of transformer 28, and this output is applied to the inverting input 46a of operational amplifier 46. Connected to the noninverting input 46b is the output of variable gain amplifier 38. The comparator 46 generates an amplified error signal $V_2$, the amplitude of which is proportional to any signal difference (distortion) between the signal present at the secondary of transformer 28, and the adjusted reference sine wave $V_1$ which is by definition substantially free of distortion. Loop 42 is a fast-responding loop because the signal comparisons are accomplished instantaneously, and the sensed signals are not averaged over several cycles, as occurs in loop 26.

The signal $V_2$ from comparator 46 is applied as one input to summing junction 24. The other input to summing junction 24 is the output $V_1$ of the variable gain amplifier 38. The output $v_1$ of the variable gain amplifier 38 is thus applied simultaneously to the noninverting input of comparator 46 and one input of summing junction 24.

Figure 6C:
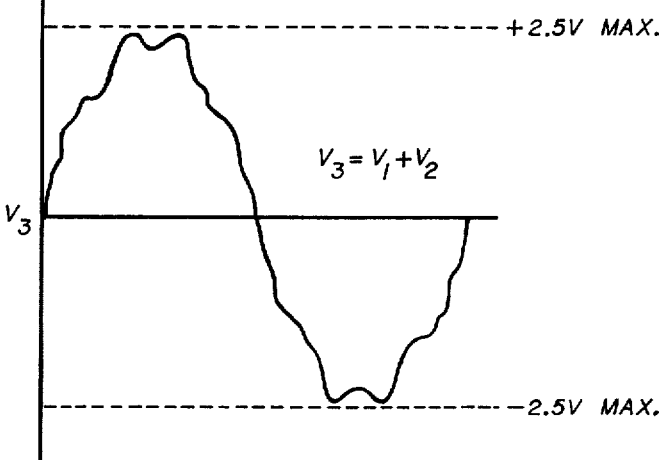
FIG. 6c is a signal diagram of the corrected sine wave input to the high speed comparator of the present invention.

The signal $V_1$ from the variable gain amplifier 38, which is the adjusted reference sine wave, is distorted in the summing junction by the signal $V_2$ from comparator 46 in a manner which is counter to the distortion introduced by the nonlinear elements in the switching and filtering circuits, and tranformer impedances. Thus, the output $V_3$ of summing junction 24, shown in FIG. 6c, is distorted in such a fashion from the reference sine wave generated by oscillator 40, that the effect of the nonlinear circuit elements are precisely compensated for and a nondistorted output signal at the inverter output results.

Several additional circuits are provided with the static inverter in order to prevent damage to the inverter from certain DC inputs. An input LC section comprised of inductor 160 in series with the input, and a capacitor 162 connected from the circuit side of the inductor 160 to ground reduces the peak value of input signal transients to a manageable level and provides signal isolation between the inverter circuit and the input lines, thereby preventing circuit switching noise from being reflected back down the input lines. A current limit circuit 164 is provided to limit the maximum value of input current at which the inverter will operate. The current coming into the inverter circuit is continually sensed by a current shunt 166, amplified, and compared against a preselected standard by limitor 164. If the input current is too high, the driver circuits 12a and 14a, which provide the driving signals for the switching transistors in response to the comparator 20 output are disabled momentarily.

Input voltage detector circuit 170 protects the inverter from input voltages which are either too low or too high for proper inverter operation. The input voltage is sensed with a resistor network and then compared with a reference voltage. One comparator is used for the low condition and another comparator for the high condition. When the input voltage is not within the range established by the reference voltages, driver sections 12a and 14a are inhibited.

Thus, a static inverter has been disclosed for converting a DC voltage, which may vary in magnitude, to a regulated AC output voltage. Control over the stability, magnitude, and configuration of the AC output signal is achieved by a combination of control circuits, including a direct loop connection from the DC input to the triangle wave oscillator, providing a first compensation for input voltage changes, an open-loop feedback circuit compensating for changes in the magnitude of the output sine wave, and an antidistortion feedback circuit which introduces countervailing distortion into the reference sine wave, such that a nondistorted AC output into a load is achieved.

Although an exemplary embodiment of the invention has been disclosed herein for purposes of illustration, it will be understood that various changes, modifications and substitutions may be incorporated into such embodiment without departing from the spirit of the invention as defined by the claims which follow.

What is claimed is:

1. A static inverter for supplying a regulated AC output signal to a load from a DC input signal, comprising:
   means for generating an AC reference signal of predetermined magnitude;
   means for generating a signal having a triangle-like waveform of selected frequency higher than said AC reference signal;
   first circuit means, including means establishing a DC reference voltage and means for converting the AC output signal at the load to a corresponding DC voltage, which first circuit means adjust the magnitude of said reference signal in a manner proportional to the difference in magnitude between said converted AC output signal and said DC reference voltage;
   second circuit means for comparing said adjusted reference signal and the AC output signal, and for generating an error signal representative of the signal diffference therebetween;
   signal summing means connected to said first and second circuit means for producing a corrected reference signal which is the algebraic sum of said error signal and said adjusted reference signal;
   comparison means, responsive to said corrected reference signal and said signal having a triangle-like waveform, generating control signals whenever a predetermined relationship exists between said corrected reference signal and said triangle-like signal exists;
   switching and filtering means responsive to said control signals for converting the DC input signal to the AC output signal, said switching means intermittenly providing said filtering means with said DC input signal under the control of said control signals, generating a square wave thereby, said filtering means being responsive to said square wave to provide the AC output signal; and
   means for coupling said inverter output signal to the load.

2. An apparatus of claim 1, wherein said coupling means includes a transformer means having primary and secondary windings, the AC output signal being applied to said primary winding, and said secondary winding being connected to the load.

3. An apparatus of claim 1, wherein said AC reference signal is a sine wave.

4. An apparatus of claim 1, wherein the frequency of said triangle-like wave is at least 100 times the frequency of said AC reference signal.

5. An apparatus of claim 4, wherein the frequency of said triangle wave is on the order of 20 kHz.

6. An apparatus of claim 1, wherein said converting means in said first circuit means includes rectifier and filtering means for developing a DC signal from the AC signal present at the load, and wherein said first circuit means includes means for comparing said DC signal with said reference DC signal.

7. An apparatus of claim 6, wherein said first circuit means further includes a variable gain amplifier connected to said AC reference signal means and responsive to the comparing means in said first circuit means for adjusting the amplitude of said AC reference signal accordingly.

8. An apparatus of claim 2, wherein said second circuit means includes means for sensing the signal present at said secondary winding, a comparator responsive to said sensing means and said variable gain amplifier, which comparator generates said error signal, and means for connecting said error signal to said signal summing means.

9. An apparatus of claim 1, including means connecting said DC input voltage to said triangle wave generating means, and further including means in said triangle-like wave generating means for controlling the magnitude of the triangle-like wave in proportion to the magnitude of the DC input voltage.

10. An apparatus of claim 9, wherein said AC reference signal is a sine wave.

11. An apparatus of claim 9, wherein the frequency of said triangle-like wave is at least 100 times the frequency of said AC reference signal.

12. An apparatus of claim 11, wherein the frequency of said triangle wave is on the order of 20 kHz.

13. An apparatus of claim 12, wherein said converting means in said first circuit means includes rectifier and filtering means for developing a DC signal from the AC signal present at the load, and wherein said first circuit means includes means for comparing said DC signal with said reference DC signal of selected magnitude.

14. An apparatus of claim 13, wherein said first circuit means further includes a variable gain amplifier connected to said AC reference signal means and responsive to the comparing means in said first circuit means for adjusting the amplitude of said AC reference signal accordingly.

15. An apparatus of claim 9, wherein said coupling means includes a tranformer means having primary and secondary windings, said inverter output signal being applied to said primary winding, and said secondary winding being connected to the load.

16. An apparatus of claim 9, wherein said second circuit means includes means for sensing the signal present at said secondary winding, a comparator responsive to said sensing means and said variable gain amplifier, which comparator generates said error signal, and means for applying said error signal to said signal summing means.

* * * * *